United States Patent Office 3,145,189
Patented Aug. 18, 1964

3,145,189
METHOD OF MAKING FREELY FLOWABLE
RUBBER COMPOSITIONS
Walter Arthur Fourier, Crystal Lake, Ill., assignor to American Can Company, New York, N.Y., a corporation of New Jersey
No Drawing. Filed Dec. 23, 1960, Ser. No. 77,783
6 Claims. (Cl. 260—45.5)

The present invention relates to fluid compositions of organic liquids and natural and synthetic rubbers such as are used to produce films and coatings of rubber by removal of the liquid, and more particularly to an improved method of producing such compositions containing two or more rubber polymers which are freely flowable and which exhibit improved characteristics as compared to such films produced by methods heretofore used.

The subject invention is an improvement over the method disclosed in the A. J. Leydon U.S. Patent 2,593,681, issued April 22, 1952, for producing fluid rubber compositions containing two rubber polymers having different solubility characteristics in the same organic solvent. Compositions made in accordance with the Leydon method flow easily and produce thick films which exhibit improved physical characteristics as compared to films produced from rubber-solvent solutions and rubber dispersions in water.

A disadvantage of the Leydon method is that it uses rubbers which have been separately coagulated from their latices and exist in the commercial solid forms. Consequently, an essential step of the Leydon method is that requiring intermilling of the solid rubbers for a period of time sufficient to insure a homogeneous finely divided mixture. This operation necessitates the use of heavy duty milling equipment such as a two or three roll mill, Banbury mixer or analogous machinery. Such equipment is generally quite expensive in initial cost and in operation, e.g., these machines must include means for cooling the rolls to remove the substantial amount of heat created in milling the dry solid rubbers so as to preclude overheating of the rubbers.

Furthermore, the operation and maintenance of such machinery usually requires the services of skilled personnel. Also, a lengthy milling period is generally required to produce a fine particle size of the suspended insoluble rubber in the fluid composition, so as to achieve a low viscosity. This results in an appreciable consumption of power and a high processing cost.

By means of the improved method disclosed herein, freely flowable fluid compositions containing organic solvent soluble and insoluble rubber polymers may be produced without the necessity for any milling or masticating step. Fluid compositions made in accordance with the present invention have a substantially higher total rubber solid content at a given viscosity than can be obtanied with solvent solutions of a soluble rubber alone. Furthermore, the fluid compositions and dried films obtained therefrom have essentially the same advantages over rubber-solvent solution compounds and rubber dispersions in water as are achieved with compositions and films made in accordance with the Leydon method.

While the total rubber solids content at a given viscosity attainable in fluid compositions made by the Leydon method may be generally higher than in compositions made by the subject method, the method of the present invention has advantages over the Leydon method as follows:

(1) The processing steps required are reduced since the steps of separately coagulating and processing the component rubbers from their latices into commercial solid form and subsequently intermilling the solid dried rubbers to finely divide and interdisperse them is obviated;

(2) The need for heavy expensive milling equipment to perform the milling operation and installation space therefor is eliminated;

(3) The processing time and costs are substantially reduced, not only by the elimination of the separate coagulation and treatment of each rubber ingredient from its latex, and the elimination of the milling or masticating step, but also by the elimination of the additional handling requirements necessarily present with additional processing operations;

(4) The physical structure of the rubber is maintained more nearly similar to the original state of polymerization and is not broken down by extended milling or masticating procedures.

Accordingly, an object of the present invention is to provide an improved and simplified method for producing fluid rubber compositions containing organic solvent soluble and insoluble polymers which have a high content of rubber solids and at the same time which have a low viscosity and are freely flowable.

Another object is to provide a method by which such fluid rubber compositions can be rapidly and inexpensively produced without the necessity for large and costly rubber milling equipment.

Another object is to provide such a method of producing fluid rubber compositions which can be cast into films having intimate rubber-to-rubber surface contact between the rubber ingredients composing the composition.

A further object is to provide such a method for producing fluid rubber compositions which can be cast into films composed essentially of rubber and containing little or no extraneous matter and which retain substantially unimpaired the characteristics and properties of the rubber ingredients used.

Yet a further object is to provide such a method for producing fluid rubber compositions which can be cast into films which essentially retain the molecular structure originally present in the individual polymers.

Numerous other objects and advantages of the invention will be apparent as it is better understood from the following description which is of a preferred embodiment thereof.

The above objects are accomplished in the present invention by taking a co-coagulated solid mass of two or more rubbery plastic polymers and subjecting the mass to simple mechanical agitation, such as in a conventional propellor type mixer or in a conventional rubber churn, in the presence of an organic liquid which is a solvent for at least one but less than all of the rubbers. The co-coagulated rubber mass consists of a homogeneous solid mixture of particles of the solvent soluble and solvent insoluble rubbers in substantially the proportions desired in the final film. The swelling of the soluble rubber particles as they pass into solution in the liquid solvent disrupts and disperses the insoluble rubber particles to produce a fluid composition consisting of a homogeneous two phase liquid mass, the external phase of which consists of the soluble rubber substantially dissolved within the liquid solvent. The internal phase consists of small particles of the insoluble rubber dispersed and suspended in the rubber solution. Under a microscope, the particles of insoluble rubber, although they may be swollen, are nevertheless still discrete and clearly visible whereas the external phase of the fluid composition fails to show any particles at all.

The latex of a natural or synthetic rubber polymer consists essentially of a suspension of extremely fine particles of rubber in an aqueous liquid or serum. Usually, crude solid rubber is obtained from its latex by a process of coagulation which process is brought about by the addition of coagulant to the latex causing the rubber particles to agglomerate and form a coherent mass of rubber termed a coagulum. Coagulants commonly used include dilute organic acids such as acetic or formic acid, alcohol, formaldehyde, mineral acids such as dilute sulfuric, and electrolytes such as sodium chloride solution.

For purposes of the present invention, the same coagulation process is used. However, prior to the coagulation step, latices of two or more selected rubber polymers are brought together in predetermined desired proportions and thoroughly mixed to form a homogeneous dispersion of the particles of each of the rubbers in the combined serum. The addition of a selected coagulant to the latice mixture causes the rubber particles to co-coagulate simultaneously and uniformly to form a homogeneous solid mixture consisting of particles of the solvent soluble and solvent insoluble rubbers in substantially the desired proportions. The coagulum thus formed, after washing to remove all traces of the serum and drying, is used directly to produce the fluid composition of the present invention.

Dried films formed from the fluid rubber composition by evaporation of the solvent have a continuous phase consisting of the soluble rubber in which the particles of the insoluble rubber are homogeneously dispersed. Due to intimate rubber-to-rubber surface contact bonding the dispersed particles and the continuous rubber phase, the resulting film substantially retains the cohesiveness, toughness, elasticity and resiliency of the original rubbers and does not re-wet or soften when exposed to hot water or steam. It is to be understood that inert fillers and pigments of various kinds in proper amounts, for instance, wood flour, ground cork, flock, metallic oxides, clays, etc. may be added to the composition. Such fillers are dispersed and do not materially affect the rubber-to-rubber surface contact of the rubbers composing the basic composition.

As used in the specification and claims, the words "rubber" and "rubbery elastic polymers" means one of the following materials: natural rubber; polymers, interpolymers and copolymers of conjugated diolefins, e.g., polybutadiene, butadiene-styrene copolymers, butadiene-acrylonitrile copolymers, polymers and copolymers of methyl pentadiene; and polymeric forms of chlorine substitution products of conjugated diolefins, e.g., polychloroprene. All of said polymeric compounds are rubbery and elastic at room temperatures even when unplasticized.

The words "rubber polymers having different solubility characteristics," "soluble rubber" and "insoluble rubber" means rubbers which are affected by the same solvent in materially different degrees. By "insoluble," it is not meant that the rubber is completely unaffected by the solvent but that, although it may be swollen somewhat, it is not dissolved. For example, natural rubber is soluble in octane; polychloroprene is not. In addition, rubber from the same chemical sources, but having different ratios in the monomers of the resulting copolymer, may be soluble or insoluble in the selected solvent depending upon monomeric ratio. For example, butadiene-styrene copolymer of high monomeric ratio of butadiene to styrene is soluble in hexane whereas the copolymer of low monomeric ratio is substantially insoluble in the same solvent.

The essential feature of the liquid solvent is that it forms a solution with at least one of the rubbers and does not dissolve, though it may swell, one of the others. Suitable liquid solvents include hexane, octane, methyl ethyl ketone, acetone and toluol. Benzol and chlorinated solvents may be used where toxic effects are not objectionable. Combinations of liquids which together form a solvent may also be used. The proportion of liquid solvent employed depends on the use to which the composition is to be put and on the type of machine by which it is to be applied, for instance, spreaders, coaters or can end lining machines, but in all cases sufficient solvent is used to dissolve one of the rubbers and to disperse the insoluble rubber in the solution thus formed.

The types and proportions of the rubbers used is determined by the particular qualities required of the film and the use to which it is to be put. While the final film has some of the characteristics of each of the rubbers, the proportion of the rubber dispersed in particle form to dissolved rubber may be so great in the dried film that there is no significant loss of any of the attributes of the dispersed rubber. For example, if the dispersed rubber is one chosen for a particular characteristic such as resistance to oils and greases, it imparts this inherent characteristic to the final film. It is thus possible to produce films having certain characteristics attributable to the dispersed rubber, which characteristics may not be attainable from solvent soluble rubbers, and also having great strength and elasticity due to the intimate surface contact and bonding of the dispersed rubber in the soluble rubber forming the continuous phase of the film.

The examples forming a part hereof are for the purpose of illustrating the practice of the subject invention using vraious rubbers and solvents and are not to be construed as limitations on the method disclosed. For convenience, letter symbols as listed in Table I are used to designate the various types of rubbers used in the examples.

In Table II, eleven illustrative examples are given of latex mixtures which may be co-coagulated to provide a mixed rubber coagulum for use in the present invention. The percentages of the various rubbers listed for each example are the percentages by weight of each rubber in the latex mixture prior to co-coagulation with the balance being essentially water.

Table III gives examples of fluid compositions made by the subject method using in each example the coagulum obtained by co-coagulation of the correspondingly numbered latex mixture of Table II. The compositions described are base compositions to which may be added other ingredients such as inert fillers, pigments, waxes, resins, plasticizers, etc., according to the use to which the particular compound is to be put.

EXAMPLES

Table I

| Letter Symbol | Type of Rubber |
|---|---|
| A | Natural rubber. |
| B | FRS-2000: Butadiene-styrene copolymer (46% bound styrene). |
| C | FRS-2006: Butadiene-styrene copolymer (23.1% bound styrene). |
| D | Hycar 1577: Butadiene-acrylonitrile copolymer (30% acrylonitrile). |
| E | Chemigum 246: Butadiene, acrylonitrile copolymer (33% acrylonitrile). |
| F | Neoprene 750: Polychloroprene. |
| G | 1500: Butadiene-styrene copolymer (24% bound styrene). |
| H | Butadiene-styrene copolymer (45% bound styrene). |
| J | Pliolite 170: Butadiene-styrene copolymer (70% bound styrene). |

Table II
COMPOSITION OF LATEX MIXTURES

| Example | Type Rubbers and Percent by Wt. in the Latex Mixture | | | | | | | | Coagulant |
|---|---|---|---|---|---|---|---|---|---|
| | Type | Percent | Type | Percent | Type | Percent | Type | Percent | |
| 1 | G | 16.1 | H | 5.4 | | | | | Salt-Acid. |
| 2 | G | 13.6 | H | 9.1 | | | | | Do. |
| 3 | A | 40.9 | B | 13.7 | | | | | Do. |
| 4 | A | 40.0 | D | 13.3 | | | | | Do. |
| 5 | C | 24.1 | E | 8.0 | | | | | Do. |
| 6 | C | 25.0 | F | 8.3 | | | | | Do. |
| 7 | C | 23.4 | E | 5.0 | F | 5.0 | | | Do. |
| 8 | C | 23.0 | B | 7.6 | | | | | Do. |
| 9 | E | 28.2 | C | 9.4 | | | | | Do. |
| 10 | C | 20.7 | E | 3.45 | F | 6.9 | J | 3.45 | Do. |
| 11 | C | 23.6 | J | 7.9 | | | | | Do. |

Table III
FLUID RUBBER COMPOSITIONS

| Example | Dissolved Rubber | | Dispersed Rubber | | Solvent | | Viscosity, Centipoises at 75° F. | Total Rubber Solids, Percent |
|---|---|---|---|---|---|---|---|---|
| | Type | Parts | Type | Parts | Type | Parts | | |
| 1 | G | 75 | H | 25 | Hexane | 482 | 700 | 17.25 |
| 2 | G | 60 | H | 40 | do | 454 | 910 | 18.1 |
| 3 | A | 75 | B | 25 | do | 1,440 | 850 | 6.5 |
| 4 | A | 75 | D | 25 | do | 1,725 | 740 | 5.5 |
| 5 | C | 75 | E | 25 | do | 490 | 840 | 17.0 |
| 6 | C | 75 | F | 25 | do | 492 | 900 | 16.9 |
| 7 | C | 70 | E | 15 | do | 570 | 900 | 15.0 |
| | | | F | 15 | | | | |
| 8 | C | 75 | B | 25 | do | 640 | 710 | 13.5 |
| 9 | E | 75 | C | 25 | Methyl-Ethyl Ketone | 735 | 940 | 12.0 |
| 10 | C | 60 | E | 10 | Hexane | 605 | 750 | 14.2 |
| | | | F | 20 | | | | |
| | | | J | 10 | | | | |
| 11 | C | 75 | J | 25 | do | 555 | 950 | 15.3 |

In the examples set forth in Tables II and III above, the weight ratio of soluble or dissolved rubber to insoluble or dispersed rubber is a minimum of about 1.5 and a maximum of about 3.0.

It is thought that the invention and many of its attendant advantages will be understood from the foregoing description and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of preparing a freely flowable rubber composition consisting essentially of a homogeneous two-phase liquid mass containing as its sole rubbery ingredients two classes of rubbery elastic polymers, each class having different solubility characteristics in the same solvent and a volatile organic liquid which is a solvent for one class of said polymers and a non-solvent for the other class thereof, one class of said polymers being dissolved in the solvent forming a solution which comprises the external phase and the other class being dispersed as fine undissolved particles in said solution which comprises the internal phase, comprising the steps of: intimately mixing a latex of said soluble class of rubbery polymer with a latex of said insoluble class of rubbery polymer; the latices being mixed in a proportion sufficient to provide a weight ratio of said soluble class of rubbery polymer to insoluble class of rubbery polymer of at least about 1.5; coagulating said rubbery polymers from said mixed latices to form a homogeneous rubbery coagulum of said solvent soluble and said solvent insoluble polymers in said weight ratio; subjecting said coagulum to nonmasticating agitation in the presence of said organic liquid until the soluble rubber is dissolved in the organic liquid and the insoluble rubber is disrupted and dispersed in the form of fine discrete particles suspended in the solution of the soluble rubber.

2. The method set forth in claim 1 wherein said weight ratio is about from 1.5 to 3.0.

3. The method set forth in claim 1 wherein said coagulating step is in the absence of said organic liquid.

4. The method set forth in claim 1 wherein the external phase of the dispersion is a solution of a butadiene-styrene copolymer.

5. The method set forth in claim 1 wherein the internal phase of the dispersion is a butadiene-styrene copolymer having 40 to 70% bound styrene.

6. The method set forth in claim 5 wherein the external phase of the dispersion is a polymerized butadiene-styrene copolymer having about 23% bound styrene.

References Cited in the file of this patent
UNITED STATES PATENTS

| | | |
|---|---|---|
| 2,593,681 | Leydon | Apr. 22, 1952 |
| 2,657,190 | Banes et al. | Oct. 27, 1953 |
| 2,880,185 | Lee | Mar. 31, 1959 |